（12）United States Patent
Jiang

(10) Patent No.: US 9,337,972 B2
(45) Date of Patent: May 10, 2016

(54) METHOD FOR INSTRUCTING USER TERMINAL TO ALLEVIATE INTERFERENCE IN A BASE STATION

(71) Applicant: Alcatel Lucent, Boulogne Billancourt (FR)

(72) Inventor: Qi Jiang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/355,658

(22) PCT Filed: Oct. 18, 2012

(86) PCT No.: PCT/IB2012/002543
§ 371 (c)(1),
(2) Date: May 1, 2014

(87) PCT Pub. No.: WO2013/064897
PCT Pub. Date: May 10, 2013

(65) Prior Publication Data
US 2014/0293948 A1  Oct. 2, 2014

(30) Foreign Application Priority Data

Nov. 4, 2011 (CN) .......................... 2011 1 0346073

(51) Int. Cl.
*H04L 5/00* (2006.01)
*H04J 11/00* (2006.01)
*H04W 72/04* (2009.01)
(Continued)

(52) U.S. Cl.
CPC ........... *H04L 5/0032* (2013.01); *H04J 11/0056* (2013.01); *H04W 72/0426* (2013.01); *H04B 7/024* (2013.01); *H04W 36/0061* (2013.01)

(58) Field of Classification Search
CPC . H04W 52/244; H04W 24/10; H04W 72/082; H04W 84/045; H04W 68/00; H04W 72/1289; H04W 52/38; H04W 72/1226; H04W 92/20
See application file for complete search history.

(56) References Cited

U.S. PATENT DOCUMENTS

2009/0247181 A1  10/2009  Palanki et al.
2010/0054237 A1   3/2010  Han et al.
2010/0238845 A1   9/2010  Love et al.
(Continued)

FOREIGN PATENT DOCUMENTS

JP  2011-4002 A    1/2011
JP  2012-169738 A  9/2012
(Continued)

OTHER PUBLICATIONS

International Search Report for PCT/IB2012/002543 dated Apr. 17, 2013.
(Continued)

*Primary Examiner* — Jung-Jen Liu
(74) *Attorney, Agent, or Firm* — Fay Sharpe LLP

(57) ABSTRACT

The present invention proposes a method for assisting a mobile terminal to alleviate inter-cell interference in a base station, comprising the step of: sending to the user terminal an identification of a major interfering cell in a radio resource control signaling. With the solution of the present invention, it is possible to assist the user terminal in more effective interference alleviation by signaling to the user terminal from the base station.

20 Claims, 1 Drawing Sheet

(51) Int. Cl.
*H04W 36/00* (2009.01)
*H04B 7/02* (2006.01)

(56) References Cited

U.S. PATENT DOCUMENTS

| | | | |
|---|---|---|---|
| 2010/0255854 A1 | 10/2010 | Lee et al. | |
| 2011/0275394 A1 | 11/2011 | Song et al. | |
| 2012/0113843 A1* | 5/2012 | Watfa et al. | 370/252 |
| 2012/0113847 A1* | 5/2012 | Narasimha et al. | 370/252 |
| 2012/0115469 A1* | 5/2012 | Chen et al. | 455/434 |
| 2012/0122440 A1* | 5/2012 | Krishnamurthy et al. | 455/418 |
| 2012/0322492 A1 | 12/2012 | Koo et al. | |
| 2013/0033998 A1* | 2/2013 | Seo et al. | 370/252 |
| 2013/0084864 A1* | 4/2013 | Agrawal et al. | 455/436 |
| 2013/0107798 A1* | 5/2013 | Gao et al. | 370/328 |
| 2013/0229971 A1* | 9/2013 | Siomina et al. | 370/312 |
| 2013/0315191 A1 | 11/2013 | Yoshimoto et al. | |
| 2014/0105224 A1* | 4/2014 | Frederiksen et al. | 370/465 |
| 2014/0204765 A1 | 7/2014 | Chai et al. | |
| 2014/0211734 A1* | 7/2014 | Seo et al. | 370/329 |
| 2014/0289351 A1 | 9/2014 | Chen et al. | |
| 2014/0341057 A1* | 11/2014 | Seo et al. | 370/252 |

FOREIGN PATENT DOCUMENTS

| | | |
|---|---|---|
| JP | 2013-524616 A | 6/2013 |
| JP | 2014-530551 A | 11/2014 |
| JP | 2014-531094 A | 11/2014 |
| KR | 10-2009-0115030 A | 11/2009 |
| KR | 10-2010-0109616 A | 10/2010 |
| KR | 10-2011-0000676 A | 1/2011 |
| KR | 2011 0098592 A | 9/2011 |
| WO | 2010107601 A1 | 9/2010 |
| WO | 2011122833 A2 | 10/2011 |
| WO | 2011130447 A1 | 10/2011 |
| WO | 2013044808 A1 | 4/2013 |

OTHER PUBLICATIONS

English Bibliography for Japanese Patent Publication No. JP2011004002A, published Jan. 6, 2011, printed from Thomson Innovation on Jun. 10, 2015, 4 pp.

English Bibliography for Japanese Patent Publication No. JP2012169738A, published Sep. 6, 2012, printed from Thomson Innovation on Jun. 10, 2015, 4 pp.

English Bibliography for Japanese Patent Publication No. JP2013524616A, published Jun. 17, 2013, printed from Thomson Innovation on Jun. 10, 2015, 4 pp.

English Bibliography for Japanese Patent Publication No. JP2014530551A, published Nov. 17, 2014, printed from Thomson Innovation on Jun. 10, 2015, 3 pp.

English Bibliography for Japanese Patent Publication No. JP2014531094A, published Nov. 20, 2014, printed from Thomson Innovation on Jun. 10, 2015, 3 pp.

English Bibliography for PCT Patent Publication No. WO2013044808A1, published Apr. 4, 2013, printed from Thomson Innovation on Jun. 10, 2015, 3 pp.

R2-121255, Handling of CRS Interference, 3GPP TSG-RAN WG2 Meeting #77bis, Apr. 11-15, 2011, Shanghai, China, 4 pp.

PCT Application No. PCT/IB2012/002543, Written Opinion of the International Searching Authority, mailed Apr. 17, 2013, 5 pages.

English Bibliography for Korean Patent Application Publication No. KR2009115030A, published Nov. 4, 2009, printed from Thomson Innovation on Feb. 8, 2016, 3 pp.

English Bibliography for Korean Patent Application Publication No. KR20100109616A, published Oct. 11, 2010, printed from Thomson Innovation on Feb. 8, 2016, 4 pp.

English Bibliography for Korean Patent Application Publication No. KR2011000676A, published Jan. 4, 2011, printed from Thomson Innovation on Feb. 8, 2016, 8 pp.

* cited by examiner

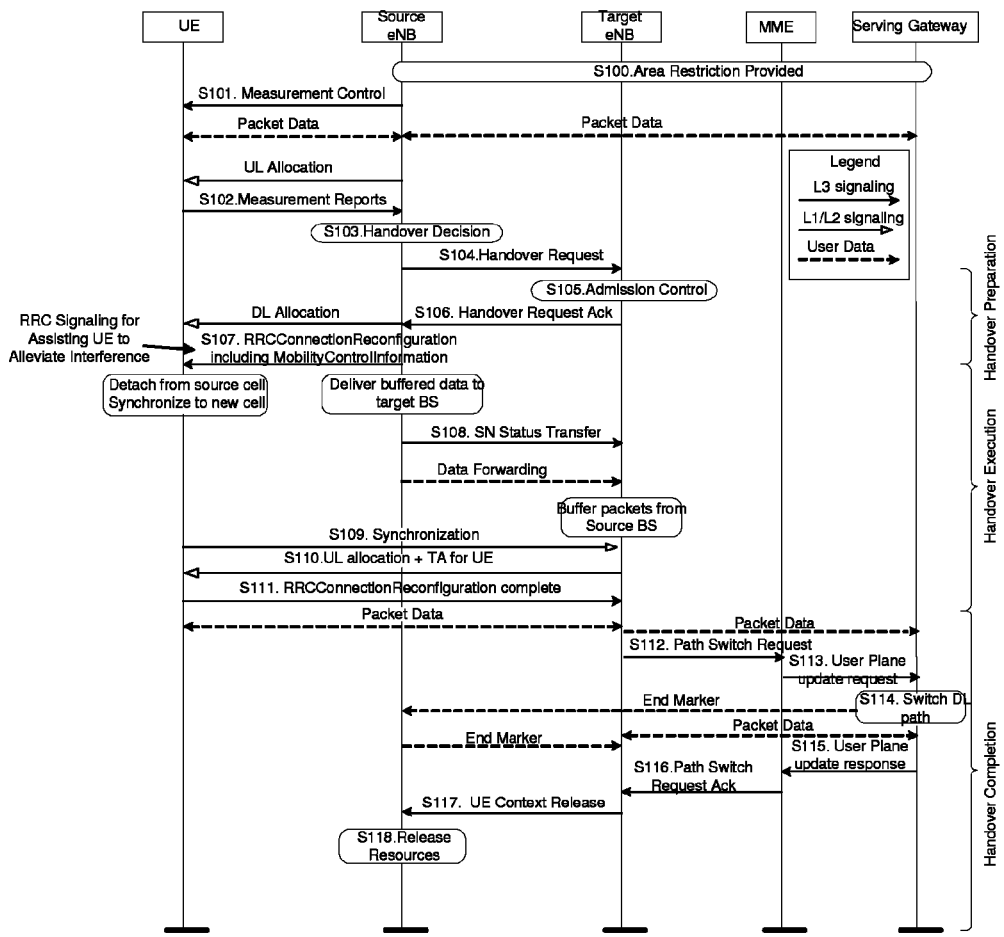

METHOD FOR INSTRUCTING USER TERMINAL TO ALLEVIATE INTERFERENCE IN A BASE STATION

FIELD OF THE INVENTION

The present invention relates to wireless wideband communication, and more specifically to a method for instructing a user terminal to alleviate interference in a base station.

BACKGROUND OF THE INVENTION

Heterogeneous networks (HetNet) have been added to the scope of the LTE-A work item. Now enhanced inter-cell interference coordination (eICIC) for co-channel HetNet deployment is one of the key technical points for Release 10.

Co-channel HetNets comprise macrocells and picocells operating on the same frequency channel. Such deployments present some specific interference scenarios for which new Inter-Cell Interference Cancelation (ICIC) techniques are required.

In one scenario, the picocells are open to users of the macrocellular network. In order to ensure that such picocells carry a useful share of the total traffic load, a user equipment (UE) may be programmed to access preferentially to the picocells rather than the macrocells. For example by biasing the Signal-to-Interference plus Noise Ratio (SINR) threshold, the UE may select a picocell to access to. Under such conditions, UEs near the edge of a picocell's coverage area and accessing the picocell will suffer strong interference from one or more macrocells. In order to alleviate such interference, some subframes may be configured as "blank" or "almost blank" in a macrocell. A blank subframe contains no transmission from the macrocell, while an "almost blank" subframe typically contains no data transmission and little or no control signalling transmission, but will contain Reference Signal (RS) transmissions in order to ensure backward compatibility with legacy terminals. The legacy terminals expect to find the reference signals for measurements but are unaware of the configuration of almost blank subframes. Almost blank subframes may also contain synchronization signals, broadcast control information and/or paging signals.

In order to make the use of blank or almost blank subframes (ABSs) effective, signalling is needed from the macrocell to the picocell across the corresponding backhaul interface, known in LTE as the "X2" interface. Note that hereafter the term "ABS" is used, and should be understood to include both blank and almost blank subframes. For LTE Release 10, it has been agreed that this X2 signalling will take the form of a coordination bitmap to indicate the ABS pattern. For example, each bit corresponds to one subframe in a series of subframes, and the value of the bit indicates whether the subframe is an ABS or not. For example, 1 indicates the subframe is an ABS, while 0 indicates the subframe is not an ABS, or vice versa. Such signalling can help the picocell to schedule data transmissions in the picocell appropriately to avoid interference, e.g. by scheduling transmissions to UEs near the edge of the picocell during ABSs, and to signal to the UEs the subframes which have low macrocellular interference and may therefore be used for RRM (Radio Resource Management)/RLM (Radio Link Monitoring)/CSI (Channel State Information) measurements.

However, as mentioned before, in order to ensure backward compatibility with legacy terminals, the cell reference signals (CRS) for measurements and some basic physical channels, such as synchronization signals (SSS (Secondary Synchronization Signal)/PSS (Primary Synchronization Signal)), broadcast control information (PBCH (Physical Broadcast Channel, SIB-1 (System Information Block)) and/or paging signals, are still transmitted no matter whether this subframe is configured to be ABS or not. That means the interference caused by Macrocell Base Station (MeNB) CRS on picocells data and control channel in ABS corresponding subframes, as well as the CRS collision and interference on basic physical channels between Macrocell and picocells, always exists. During 3GPP RAN1 discussion, the cell range expansion (CRE) by bias cell selection is considered as one major approach to extending the coverage of the picocell and then balancing the traffic load. When the selected bias value for CRE becomes larger, these two kinds of interference will become more seriously. It is because when the selected bias value for CRE becomes larger, the coverage range of the picocell becomes larger, and the interference from the macrocell strengths as well.

Currently in RAN plenary meeting #51, the "Further Enhanced Non-CA Based ICIC for LTE", which focuses on the UE performance enhancement, has been agreed as the new work item for Rel-11 eICIC topic. To significantly improve UE DL control and data channel detection ability, it will become the major research major regarding whether to improve UE measurement/reporting mode (including necessary signaling design) on which existing FDD and TDD systems depend and whether to improve the UE performance requirements (achieving related or standard-related improvement) in the presence of dominant interferers (including colliding and non-colliding RS, as well as, MBSFN used as ABS, as well as ABS subframe configurations).

However, until now there is no detailed technical solution to describe how UE enhances its performance requirements and detection ability.

SUMMARY OF THE INVENTION

According to a first aspect of the present invention, there is provided a method for assisting a mobile terminal to alleviate inter-cell interference in a base station, comprising the step of: sending to the user terminal an identification of a major interfering cell in a radio resource control signaling.

With the solution of the present invention, the user terminal is assisted to more effectively alleviate interference by signaling to the user terminal from the base station. The information is valuable for the user terminal to know more interference status about the interfering and interfered cells, as well the network configuration information. All the information can be used for the user terminal to perform interference alleviation, such as Interference Cancellation, Transmission Muting, Receiving Puncture and interference suppression. In addition, in an embodiment there is defined when to transmit the signaling based on handover or cell selection/reselection procedures, which is also helpful to the user terminal interference alleviation.

BRIEF DESCRIPTION OF THE DRAWINGS

Other objects, features and advantages of the present invention will become clearer upon reading of the following detailed description of nonrestrictive embodiments of the present invention, when taken in conjunction with the accompanying drawings, in which:

FIG. 1 illustrates a schematic view of cell handover according to a concrete embodiment of the present invention.

The same or similar reference numerals denote the same or similar step features or means/modules.

DETAILED DESCRIPTION OF EMBODIMENTS

First of all, several terms used in the present invention are defined as below.

Heterogeneous network: the so-called heterogeneous network is a network that comprises some kinds of base stations (e.g., macro base stations, other microcellular base stations, etc.) with at least partially overlapping coverage areas.

Picocell: an interfered cell in the present invention. In heterogeneous networks, a picocell typically covers a small area, such as in-building (offices, shopping malls, train stations, etc.). In cellular networks, picocells are typically used to extend coverage to indoor areas where outdoor signals do not reach well, or to add network capacity in areas with very dense phone usage for hotspot coverage.

Macrocell: an interfering cell in the present invention. A macrocell is a network that provides radio coverage served by a high power cellular base station.

Almost blank subframe (ABS)

CRE biased rule

In order to accomplish the purpose of cell range expansion, a biased value is added for the picocell RSRO/RSPQ selection so that user terminals originally under the macrocell governance can access to the picocell. For example, an original threshold of RSRP/RSRQ is −6 dB, and a biased value is −3 dB; that is, user terminals between −9 dB and −6 dB that could not access to the picocell originally can access to the picocell through CRE.

Then, the discussion will introduce the background of RRC signalling involved in the present invention. During 3GPP RAN1 discussion, the cell range expansion (CRE) by parameters of bias cell selection is considered as one major method to extend the coverage of the picocell and then balance the traffic load between macrocell and picocell. Although the almost blank subframe can be configured on the interfering cell to reduce the interference on the interfered cell, the basic channels or signals, such as Cell Reference Signals (CRS), Physical Broadcast Channels (PBCH), Primary Synchronization Signals (PSS)/Secondary Synchronization Signals (SSS) and System Information Blocks (SIB), will be transmitted, which also has impact on the reception of signals on control and data channels for the user terminals served by the interfered cell.

Interference cancellation (IC) at a user terminal may be a way to enhance the user terminal's capability for the detection of both control and data channels. However, in order to perform IC on the user terminal side, it is more advantageous to inform the user terminal of information on network deployment and major interfering cell before performing IC. Since the macrocell knows more information on network deployment and major interfering cell compared to the user terminal itself, using Radio Resource Control (RRC) signalling from the macrocell to the user terminal will be a reasonable method to inform such kind of information. All these information can be treated as the recommendation on the base station sides.

With this kind of information, the user terminal will know more about both the interference status and network deployment, such as the synchronization information, major interfering cell, CSI-RS configuration, CRS for a serving cell and an interfering cell, Multimedia Broadcast Single Frequency Network (MBSFN) or ABS configuration. All these information will impact the detailed procedures of performing interference cancellation by the user terminal. Since the user terminal IC can be treated as the implementation issues of the user terminal itself, the present invention will mainly focus on the method of a base station notifying the signaling for assisting a user terminal in interference cancellation.

It should be noted that although illustration has been presented above by taking interference cancellation as an example, the signaling interaction proposed by the present invention also applies to other solutions for assisting a user terminal in interference alleviation, such as Rx Puncture, Tx Muting, Interference Suppression, which will be described in detail below.

UE Specific RRC Signaling

Since the UE interference alleviation will only be valuable for the UEs under strong interference from the interfering cell, it is better to design it in UE specific type. The decision regarding which UE/UEs the signaling for interference alleviation is transmitted to depends on the CSI or RSRP (Reference Signal Receiving Power)/RSRQ (Reference Signal Receiving Quality) measurement report from the UE(s). That means if RSRP measurements from the primary cell and interfering cell exceed a predefined threshold, then it is necessary to send the signaling for interference alleviation to this user terminal from the base station. This threshold can be decided by the network and updated semi-statically.

When to Transmit it

Currently the CRE is only for RRC connect mode and may be extended to RRC idle model. Based thereon, the discussion is separated into two scenarios: during handover (corresponding to RRC connect) and cell selection/re-selection (corresponding RRC idle).

Handover

When CRE is only available for RRC connect mode, it means the user terminal will first camp on the macrocell (source base station), then handover to the picocell (target base station) based on biased rules. FIG. 1 shows an example of handover procedure.

First of all, area restriction is provided in step S100. Then, a source cell sends measurement control to a user terminal in step S101. The user terminal sends measurement reports to the source cell in step S102. The source cell makes a handover decision in step S103. The source cell makes a handover request to a target cell in step S104. The target cell performs admission control in step S105. Next, the target cell initiates a handover request acknowledgment to the source cell in step S106. In step S107, the source cell sends an RRCConnectionReconfiguration message to the user terminal. In step S108, the source cell sends an SN (Sequence Number) status transfer to the target cell. In step S109, the user terminal sends synchronization information to a target base station. Subsequently in step S110, the target base station sends uplink allocation (UL allocation) and TA for the user terminal. In step S111, the user terminal sends to the target base station RRCConnectionReconfiguration complete information. In step S112, the target base station sends a path switch request to a Mobility Management Entity (MME). In step S113, MME sends a user plane update request to a serving gateway. In step S114, the serving gateway switches a downlink path. Then in step S115, the serving gateway returns a user plane gateway response to MME. In step S116, MME sends a path switch request acknowledgement to the target base station. In step S117, the target base station sends UE content release to the source base station. Finally in step S118, the source base station releases resources.

As is clear from FIG. 1, before handover, the user terminal will perform RSRP/RSRQ measurement and report it to the macrocell. After receiving the CSI measurement from the user terminal, although the RSRP of the macrocell will be larger than the RSRP of the picocell, the macrocell will handover this user terminal to the picocell based on CRE rules. At step S106, after receiving the "Handover Request Ack", the macrocell will inform the user terminal of the RRC signalling for mobilityControlInformation necessary for handover. The signaling for interference alleviation as proposed by the present invention can be sent to the user terminal together with the RRCConnectionReconfiguration message, as shown also in FIG. 1. The RRCConnectionReconfiguration message may include RRC signaling of the mobilityControlInformation, where both mobilityControlInformation and RRCConnectionReconfiguration are carriers of RRC signaling, and the signaling for interference alleviation may be embedded into RRCConnectionReconfiguration.

As will be appreciated by those skilled in the art, although the macrocell shown in FIG. 1 sends the signaling for interference alleviation to the user terminal before the user terminal completes handover, if the user terminal has the capability of receiving information carried by these RRC from the picocell, the signaling for interference alleviation may also be provided to the user terminal by a base station of the picocell after the user terminal completes handover from the macrocell to the picocell.

Cell Selection/Re-Selection

If CRE extends to RRC idle mode, that means the UE will directly camp on the picocell during cell selection/re-selection procedure based on biased cell selection rules. For this scenario, the picocell needs to inform the user terminal of the signalling for interference alleviation if the measurement report received by the base station of the picocell from the user terminal meets the pre-defined CRE requirement discussed before. This rule should be the same as the rule during handover.

What Kind of Information to be Transmitted to the User Terminal for Interference Alleviation In order to perform interference alleviation for performance enhancement, as well as guarantee the reception of basic signals, such as, synchronization channel, broadcasting channel and control signals, the user terminal needs to firstly estimate the interference from the major interfering cell, and then eliminate it from the received signals. To this end, the user terminal should have enough accurate channel estimation results and also the detection ability of the neighbouring interfering cell. In the following part, all the potential necessary information required to guarantee interference alleviation at the user terminal will be listed.

Major Interfering Cell Identification

It is helpful for the user terminal to perform interference alleviation if the user terminal knows which neighbouring cell is the major interference source. For example, after knowing this, the user terminal can rebuild the interference generated from this major interference source and then perform the interference cancellation at the receiver. The major interfering cell identification is also applicable to scenarios such as Rx Puncture, Tx Muting and Interference Suppression. Although based on the currently CSI measurement, it is possible for the user terminal to identify the major interference source by configuring two different CSI measurement sets. But it is hard to identify the major interference source if there are more than two major interference sources, if there exist solutions such as Tx Muting, Interference Supporession, and when applying ABS solution for eICIC, thus the measured interference status will become more complex. Based on this, it is a good solution that the base station informs the accurate major interfering cell identification based on network deployment to the user terminal. The steps to fulfill this solution comprise: the primary cell can directly combine this information with the PCID, and directly suggest the user terminal that the neighboring cell with some dedicated PCID maybe the major interfering cell. After that, the user terminal can focus on the interference cancellation on these cells with dedicated PCID. The following steps will describe in detail how the user terminal performs interference alleviation with the assistance of PCID information.

In addition, another approach to identifying the major interfering cell is to inform the user terminal of the frequency domain difference value between the position of CRS of the major interfering cell and the position of CRS of the primary cell. Upon acquiring the information, the user terminal knows it may further acquire:

Physical Cell Id (PCID)

The physical cell ID comprises a physical cell ID of the primary cell, a physical cell ID of the interfering cell, as well as CRS collision status.

Based on the definition of ABS, CRS of the interfering cell will be transmitted both on ABS and non-ABS subframes to guarantee the reception of the legacy user terminal, i.e., guarantee the backward compatibility. That means, the CRS interference on both PDCCH and PDSCH always exists, while for MBSFN type ABS, no CRS interference exists on PDSCH. In order to cancel the interference generated by neighboring cell CRS, the user terminal needs to know the CRS sequence, mapping position and experiencing channel. All these information are related to PCID configuration. Currently the primary and neighboring cell ID information can be sent by SystemInformationBlockType4 (SIB4). However, all these information are optional, that is, the base station does not transmit this information in mandatory way. If it is achieve the object of interference cancellation at the user terminal, then this information should be sent in mandatory way. Since the PCID is related to the CRS sequence generation and mapping position, all the information will impact the channel estimation for primary and neighboring cells, as well as the cancellation of CRS generated interference. By receiving the interfering cell PCID information as well as the major interfering cell identification, the user terminal can know the Resource Element (RE) position seriously interfered by the neighboring cell, then rebuild the interfering signal and its experiencing channel, and finally fulfill the interference cancellation. It should be noted that SIB4 includes information on neighboring cells which is obtained from network configurations and which includes information relates to all neighboring cells of the current cell, rather than limited to only the interfering cell generating strong interference on the user terminal. In addition, in the present invention, PCID is sent based on the RRC signaling which is UE-specific, whereas the Cell-specific information in SIB4 is broadcast information and not user-specific.

Besides, the above discussion is based on the assumption that there is no CRS collision. If the CRS collision possibly exists, whether the CRS is under collision should also be informed to the user terminal. The reason is that, if CRS is also under collision, then the CRS based channel estimation is not accurate. The user terminal should use other reference signals, such as CSI-RS, to perform interference cancellation for neighboring cells. This will be described in detail below.

CSI-RS Configuration for Primary Cell and Interfering Cell & CSI-RS Collision Status The reason for CSI-RS configuration notification to the user terminal is similar to the above reason for CRS notification to the user terminal. Currently CSI-RS has been defined in RAN1 for enhanced transmission for Rel-10 user terminals, such as MU-MIMO and CoMP. Although CSI-RS is sparser compared to CRS, the possibility of CSI-RS collision still perhaps exists. Besides, CSI-RS is also an alternative for channel estimation if CRS is highly collided. Hence, it is necessary to inform the user terminal of the CSI-RS configuration for primary cell and interfering cell. With this information, the user terminal can also use the CSI-RS of the neighboring cell as a reference signal for neighboring cell channel estimation, and estimate the interference signal on a receiving node to further perform interference cancellation.

ABS Type if ABS is Configured

Currently two kinds of ABS are supported by RAN1, which are almost blank subframes with reduced power or activity and MBSFN (Multimedia Broadcast Single Frequency Network) subframes. For these two configurations, the interference status on PDSCH will be different. Take one example, for MBSFN configured by the macrocell, there is no CRS interference on PDSCH from macrocell to picocell. On the contrary, for non-MBSFN configuration, i.e., real ABS configuration, CRS interference always exists on PDSCH. Depending on whether there is MBSFN configuration or real ABS configuration, the user terminal will perform different interference cancellation steps during receiving. For MBSFN type ABS, the user terminal performs interference cancellation not on PDSCH but on PDCCH. For real ABS configuration, the user terminal needs to perform interference cancellation on both PDCCH and PDSCH. In this manner, for different ABS types, if a subframe is configured with MBSFN transmission, then the user terminal, after receiving the signaling from the base station, knows that the subframe is configured with MBSFN transmission, and does not need to perform interference cancellation on PDSCH, thereby simplifying its operations.

Synchronization Information

Based on the current performance requirement on the synchronization channel, the SINR threshold is −7.5 dB in RAN4. However, when the biased value is larger than 6 dB, then PSS/SSS can not satisfy RAN4's requirement. That means, for handover scenarios, even a user terminal will be handed over to a picocell, the user terminal can not be synchronized to the picocell. Hence, one solution is that the macrocell transmits the synchronization information to the user terminal by RRC signalling before its handover. The information can be the offset of the starting subframe number, e.g., the offset between the starting subframes of an original cell before handover and a target cell after handover. Since the offset might not be aligned at the subframe level, it may include the offsets at both subframe level and OFDM symbol level. Since one OFDM symbol will occupy 66.7 us, then this information should also include the fractional part after SF level offset and OFDM symbol level offset. For example, the OFDM symbol level offset is 0.54 OFDM symbols. After receiving the information from the macrocell before handover to the picocell, the user terminal will not need to detect the synchronization signaling (PSS/SSS) for the picocell when the selected biased value exceeds the synchronization sequence detection ability of the user terminal itself. With the information, it is not necessary to design a new signal for SYNC or enhance the receiver ability to meet the requirement of a larger biased value.

It should be emphasized that if the network works in a synchronous way, that means macrocells and picocells are aligned perfectly, the synchronization information is not needed.

The embodiments of the present invention have been described above. However, the present invention is not limited to specific systems, apparatuses and concrete protocols. Instead, various variations or modifications may be made by those skilled in the art within the scope of the appended claims.

Those of ordinary skill in the art may understand and implement other alterations of the disclosed embodiment by studying the disclosure of the specification, the accompanying drawings and the appended claims. In the claims, the terms "comprises" and/or "comprising" do not preclude other elements and steps, and the wording "a" and "an" does not preclude the plural forms. In the present invention, "first" and "second" merely represent names but do not present an ordering relation. In practical applications of the present invention, one component might perform functions of multiple technical features quoted in claims. Any reference numeral in claims should not be construed as limiting the scope.

What is claimed is:

1. A method for assisting a user terminal to alleviate inter-cell interference in a heterogeneous network, comprising:
   determining a user terminal in a heterogeneous network is experiencing interference between neighboring base stations after receiving a measurement report from the user terminal at one or more of the neighboring base stations, the neighboring base stations comprising an interfering base station and an interfered base station; and
   sending a radio resource control message from the interfering or interfered base station to the user terminal carrying network deployment information and identifying the interfering base station, wherein the user terminal is configured to alleviate inter-cell interference from the interfering base station based at least in part on content of the radio resource control message.

2. The method according to claim 1, wherein the radio resource control message identifies the interfering base station by at least one of:
   a physical cell identification associated with the interfering base station; and
   a difference between physical cell identifications of the interfering base station and a current serving base station of the user terminal.

3. The method according to claim 1,
   wherein the radio resource control message includes a type of an almost blank subframe used by the interfering base station.

4. The method according to claim 1,
   wherein the radio resource control message includes configuration information of a channel state information-reference signal for at least one of the interfering and interfered base stations.

5. The method according to claim 1,
   wherein the radio resource control message includes synchronization signaling related information for the interfered base station.

6. The method according to claim 5, wherein the synchronization signaling related information comprises an offset of a starting subframe number.

7. The method according to claim 6, wherein the offset of the starting subframe number comprises a subframe level offset and/or an OFDM symbol level offset.

8. The method according to claim 1, wherein the interfering base station performs the sending before a user terminal handover or cell reselection to the interfered base station.

9. The method according to claim 8, wherein the interfering base station comprises a macrocell base station.

10. The method according to claim 1, wherein during a user terminal handover or cell reselection, the interfered base station performs the sending after a user terminal handover or cell reselection to the interfered base station.

11. The method according to claim 10, wherein the interfered base station comprises a picocell.

12. A method for assisting a user terminal to alleviate inter-cell interference in a heterogeneous network, comprising:

determining a user terminal in a heterogeneous network is experiencing interference between neighboring base stations after receiving a measurement report from the user terminal at one or more of the neighboring base stations, the neighboring base stations comprising an interfering base station and an interfered base station; and sending a radio resource control message from the interfering base station to the user terminal carrying network deployment information and identifying the interfering base station, wherein the user terminal is configured to alleviate inter-cell interference from the interfering base station based at least in part on content of the radio resource control message.

13. The method according to claim 12, wherein the user terminal is configured to use interference cancellation to alleviate the inter-cell interference from the interfering base station.

14. The method according to claim 12, wherein the user terminal is configured to use at least one of transmission muting, receiving puncture, and interference suppression to alleviate the inter-cell interference from the interfering base station.

15. The method according to claim 12, wherein the interfering base station is a macro base station and the interfered base station is pico base station.

16. The method according to claim 12, wherein the interfering base station is a source base station and the interfered base station is target base station in relation to a user terminal handover or cell reselection.

17. A method for assisting a user terminal to alleviate inter-cell interference in a heterogeneous network, comprising:

determining a user terminal in a heterogeneous network is experiencing interference between neighboring base stations after receiving a measurement report from the user terminal at one or more of the neighboring base stations, the neighboring base stations comprising an interfering base station and an interfered base station; and sending a radio resource control message from the interfered base station to the user terminal carrying network deployment information and identifying the interfering base station, wherein the user terminal is configured to alleviate inter-cell interference from the interfering base station based at least in part on content of the radio resource control message.

18. The method according to claim 17, wherein the user terminal is configured to use at least one of interference cancellation, transmission muting, receiving puncture, and interference suppression to alleviate the inter-cell interference from the interfering base station.

19. The method according to claim 17, wherein the interfering base station is a macro base station and the interfered base station is pico base station.

20. The method according to claim 17, wherein the interfering base station is a source base station and the interfered base station is target base station in relation to a user terminal handover or cell reselection.

* * * * *